United States Patent [19]

Newton

[11] Patent Number: 4,578,153

[45] Date of Patent: Mar. 25, 1986

[54] SECTIONED BUBBLE TRAY DISTILLATION OVER A WIDE RANGE OF FEED COMPOSITION AND BUBBLE TRAY LOADING

[75] Inventor: Charles L. Newton, Bethlehem, Pa.

[73] Assignee: Air Products and Chemicals, Inc., Allentown, Pa.

[21] Appl. No.: 386,166

[22] Filed: Jun. 7, 1982

Related U.S. Application Data

[63] Continuation of Ser. No. 215,490, Dec. 11, 1980, abandoned.

[51] Int. Cl.[4] .............................................. B01D 3/20
[52] U.S. Cl. ..................................... 203/99; 202/158; 261/114 A
[58] Field of Search ............... 202/158; 196/100; 261/114 R, 114 TC, 114 A, 114 JP; 55/68, 90, 84; 203/99

[56] References Cited

U.S. PATENT DOCUMENTS

| | | | |
|---|---|---|---|
| 1,848,462 | 3/1932 | Corbett | 202/158 |
| 2,085,522 | 6/1937 | Baars | 261/114 R |
| 2,197,199 | 4/1940 | Welch | 261/114 R |
| 2,692,128 | 10/1954 | Bowles | 261/114 R |
| 2,965,548 | 12/1960 | Hachmuth | 202/158 X |
| 3,151,042 | 9/1964 | Koshoot | 202/158 X |
| 3,151,046 | 9/1964 | Larson | 202/158 X |
| 3,712,595 | 1/1973 | Hirsch | 261/114 A |
| 4,102,659 | 7/1978 | Martin | 55/68 |
| 4,247,368 | 1/1981 | Bannon et al. | 202/158 |

OTHER PUBLICATIONS

Bolles, "Optimum Bubble-Cap Tray Design", Mar. '56, published in Petroleum Process., pp. 82-95.

Primary Examiner—Wilbur Bascomb
Attorney, Agent, or Firm—Russell L. Brewer; E. Eugene Innis; James C. Simmons

[57] ABSTRACT

A volatile component over a wide range of concentrations in a multicomponent feed to a distillation column is accommodated at varying feed flow rates without destroying bubble tray efficiency. This is effected by establishing on a bubble tray a plurality of separation zones having discrete and different liquid pressure seals above bubble apertures on the tray. To avoid entrainment, vapor flow restrictors are utilized with bubble apertures in at least one separation zone having less liquid head to offset a tendency of proportionately increased vapor flow through such a bubble aperture during operation of separation zones having a liquid head differential. Intermediate weirs or bubble apertures having different elevations below a liquid level on the tray can be used to establish such separation zones of differing liquid heads.

3 Claims, 4 Drawing Figures

SECTIONED BUBBLE TRAY DISTILLATION OVER A WIDE RANGE OF FEED COMPOSITION AND BUBBLE TRAY LOADING

This is a continuation of application Ser. No. 215,490, filed Dec. 11, 1980, and now abandoned.

TECHNICAL FIELD

This invention relates generally to the distillation separation of a multicomponent feed in a distillation column having a bubble tray, wherein liquid flows across the tray and vapor rises through the tray and to an improved bubble tray.

BACKGROUND OF THE PRIOR ART

It is known that in the separation of a multicomponent feed in a bubble tray distillation column, bubble tray efficiency is substantially reduced by poor vapor contact distribution across the tray. Maldistribution of vapor over the tray retards tray efficiency, particularly when vapor maldistribution occurs over a lateral cross-section of the tray perpendicular to the liquid stream. In the worst case, only a portion of the bubble apertures in the lateral cross-section(s) operates to contact liquid with rising vapor, thus some liquid passes through the cross-section(s) over non-bubbling apertures thereby avoiding vapor contact.

Maldistribution of bubble contact over the bubble tray generally becomes a problem at vapor flow rates lower than a design range. Bubble tray vapor loading ranges, or "turndown ratios," i.e. the maximum to minimum vapor rates accomodated efficiently by conventional tray designs, are referenced in the literature and generally limited to the following ratios: Packed Column, 4/1; Sieve Tray, 3/1; Bubble Cap, 4/1; Valve Tray, 4/1; Dual Weighted Valve Tray, 8/1; and V-Slotted Bubble Cap with Slotted Weir, 8/1. At vapor rates below a conventional design rate indicated by the turndown ratio, a maldistribution of vapor flow over a portion of the bubble tray is generally caused by non-uniformity of the liquid pressure seal or liquid head above bubble apertures on the tray. The non-uniform liquid pressure seals are attributable to unlevelness of the tray or to the liquid level gradient inherently caused by the flowing liquid. On the other hand, vapor rates above a maximum design rate produce an undesirable excessive liquid entrainment in the vapor rising from the bubble tray.

Stepped-level bubble trays having stepped-level bubble caps or intermediate weirs have been suggested as a means to achieve a uniform liquid head by matching bubble cap elevation to the flowing liquid level gradient across the bubble tray. In this way vapor distribution is equalized across the tray because of the equalization of the pressure seal established by the liquid gradient, especially at high liquid flow loading. See "Optimum Bubble-Cap Tray Design" by W. L. Bowles, *Petroleum Processing* (March, 1956), page 89.

A continuation of the Bowles article in *Petroleum Processing* (April, 1956), page 75, suggests, for low vapor loads, blanking off some rows of caps on bubble trays, in the portion of the distillation column where lower vapor loads are anticipated. This is done for the purpose of making a single tray design usable throughout the column.

Mase, U.S. Pat. No. 1,765,087, shows a covered liquid and gas contact apparatus having baffled sections to cause gas to flow laterally in a circuitous path and make a series of contacts with liquid at a uniform velocity through the sections. The apparatus is primarily used for absorption and permits an increased number of contacts without increasing the size of the tower.

Papp, U.S. Pat. No. 3,584,844, shows circulating vapor-laden liquid from a weired bubble plate in a vertical plane to reduce a concentration gradient across the plate. The circulation of liquid decreases the specific weight of a portion of the liquid with respect to other portions in an area upstream from the end weir, the objective being uniform mass transfer conditions on the plate. In this way tray efficiency for a given flow rate is enhanced.

Koshoot, U.S. Pat. No. 3,017,950, discloses a bubble plate construction which takes the advantages of packed columns, e.g. low pressure drop, without the disadvantages e.g. poor vapor-liquid contact. The bubble plate comprises three or more plates secured in a vertical column for rotational displacement with respect to each other. To achieve uniform vapor distribution and reduce entrainment, bubble tubes carry vapor upwardly and then downwardly through the liquid. Entrainment and maldistribution are minimized since there is no liquid pressure seal above the aperatures.

However, prior art techniques do not provide for the efficient accomodation of wide range of vapor rates through the bubble tray, but rather conventional methods result in maldistribution of bubbles at the lower vapor rates or excessive entrainment at the higher vapor rates.

SUMMARY OF THE INVENTION

It has been found that wide concentration ranges of a volatile component in a multicomponent feed to a distillation column, including turndown, i.e. reduced, flow rates of said feed, can be efficiently separated by using an improved bubble tray. A bubble tray conventionally has a tray floor having a liquid entrance, a liquid outlet, and a liquid pathway between said entrance and said outlet, said floor having a plurality of bubble apertures therein. A downstream overflow weir is placed on the tray, generally near the outlet so that it traverses the liquid pathway. The improvement resides in incorporating a plurality of separation zones traversing the liquid path on the tray, wherein each separation zone extends across the tray and includes a plurality of bubble apertures, each separation zone having a discrete liquid pressure seal, i.e., discrete liquid head. In a preferred embodiment, vapor flow through apertures in separation zones having less liquid head is restricted by utilizing flow restrictors which increase aperture resistance to vapor flow. This increased resistance offset a tendency of proportionately increased vapor flow through apertures positioned in the separation zones having less liquid head when a plurality of separation zones are operating.

Intermediate weirs can be positioned on the tray to establish the varied liquid heads, or the varied liquid heads can be established by varying the placement of bubble aperture elevations below the liquid level.

Advantages of the bubble tray apparatus and distillation process of this invention are several and include:

an ability to handle a wide concentration range of a volatile component in a multicomponent feed to a distillation column;

an ability to accommodate varying feed rates to the column including varying feed rates of a multicomponent feed over a wide concentration range of a volatile component;

an ability to reduce tray inefficiency caused by maldistribution of bubbles across a bubble tray at turndown vapor flow rates;

an ability to avoid excessive liquid entrainment at higher vapor flows through substantial equalization of vapor flow through the caps; and an ability to increase the range of bubble tray vapor loading.

DETAILED DESCRIPTION OF THE INVENTION

Conceptually, the invention can be viewed as establishing a plurality of bubble tray distillation columns within a larger distillation column. At low vapor flow rates only the smallest column is operative, but as the flow rate increases, additional distillation columns become operative. At the maximum flow rate, all of the individual columns are operative.

The establishment of varying sizes of distillation columns within the distillation column itself is achieved as follows. In accordance with my invention, a plurality of bubble trays are altered to provide a plurality of separation zones incorporating bubble apertures along the path of liquid flowing across the tray. Each separation zone is segregated by establishing a discrete liquid head or liquid pressure seal within each separation zone and varying the liquid head or seal between different separation zones so as to regulate or control which bubble apertures on the tray have vapor flow. Such control is dependant on the pressure of the total vapor flow through the tray.

In the design of the bubble tray, a first separation zone having the smallest liquid pressure seal is established and is designed with a pressure seal such that it always has vapor flow even at the lowest vapor rates. A second separation zone having a liquid pressure seal discretely different from the first separation zone is established and is controlled to begin operation, i.e., bubbling, only at some increased pressure. Vapor flow in the second zone begins in that zone at a point where an increment in the tray vapor pressure begins to exceed the liquid pressure seal differential between the first and second separation zones. This procedure is used with each of the separation zones on the tray, i.e., each of the separation zones will become active at a preselected vapor flow rate. To summarize then, as the vapor flow rate increases from the minimum where one zone is operating, the effective size of the tray becomes proportionately larger because of the activation of additional separation zones having the higher liquid pressure seals. At the higher vapor flow rates the higher pressure seals are overcome, and those separation zones become operative. Thus, in effect as mentioned, the column has a built-in variable size bubble tray, and hence variable size distillation columns within the distillation column itself.

Figures 1, 1A:
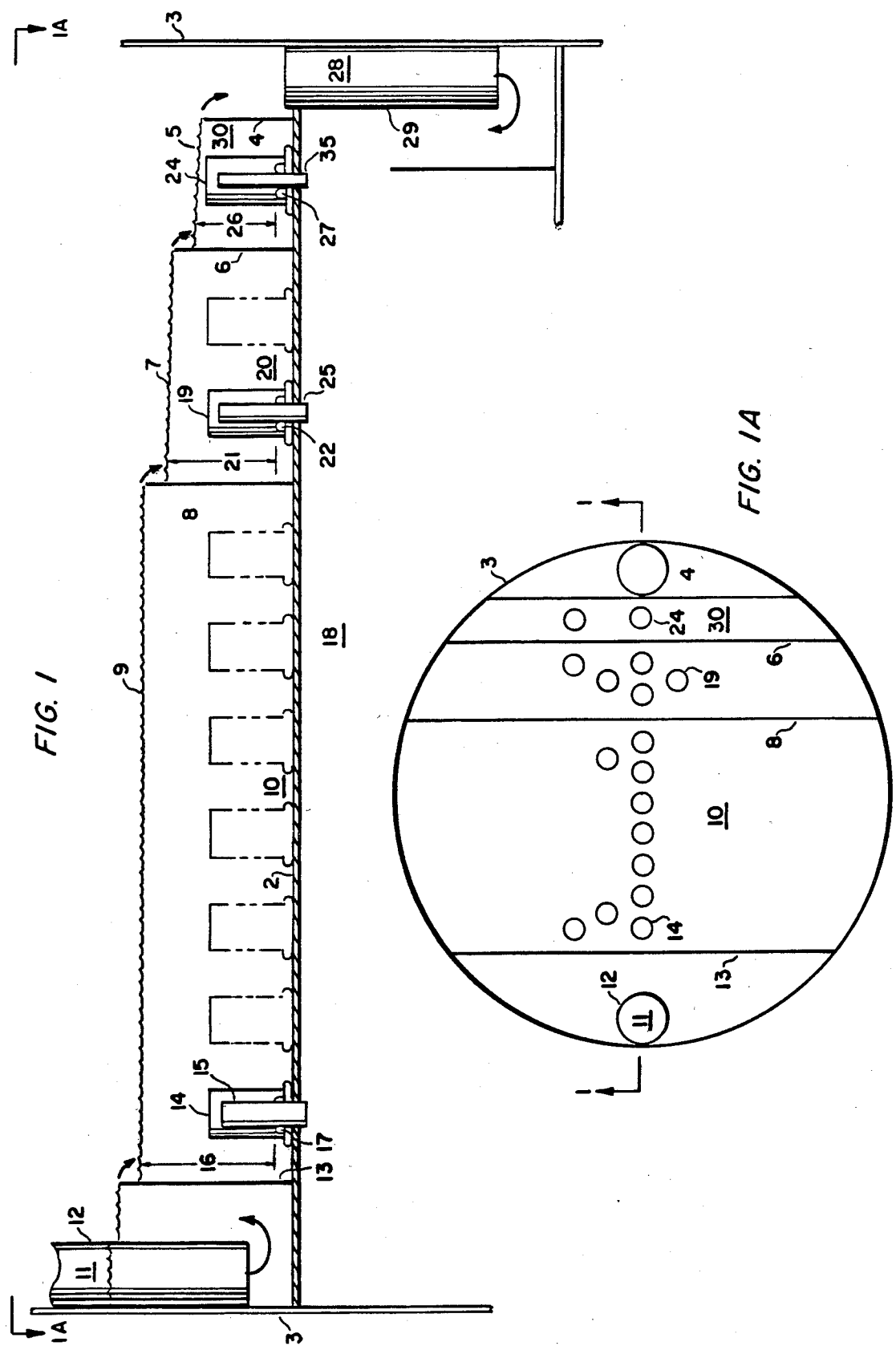
FIG. 1 and FIG. 1A are horizontal and top views (plane 1-A), respectively, of a bubble tray having weired separation zones of varying liquid level above bubble cap slots.

To aid in understanding tray construction, reference is made to FIGS. 1 and 1A. Bubble tray 1 having tray floor 2, fixed to outer shell 3 of a distillation column (not shown), has end weir 4 and intermediate weirs 6 and 8. Liquid in zone 11 from an overhead bubble tray or feed line is passed through downcomer 12, over inlet baffle 13, and across tray floor 2 respectively, to outlet 28 (direction indicated by arrow). This liquid then is passed through downcomer 29 to the bubble tray below and the process repeated. Weirs 4, 6, and 8 are of different extensions, or heights, above tray floor 2 and extend across the liquid path from the inlet to the outlet, thereby causing liquid flowing across the tray to collect in separation zones 30, 20, and 10, respectively. Because weirs 4, 6 and 8 are of different heights there are corresponding discrete liquid levels 5, 7, and 9 in each separation zone. Additional separation zones having liquid levels varying discretely from that shown in FIG. 1 may be provided by the placement of additional weirs of different heights above tray floor 2.

Bubble caps 14, having bubble slots 17 and risers 15, are positioned within the separation zones, e.g. separation zone 10. A liquid pressure seal 16 is formed by the liquid head between bubble slots 17 and liquid level 9. Because of this pressure seal, vapor rising from area 18 will pass through first separation zone 10 only at a pressure sufficient to overcome the pressure drop resistance formed by liquid pressure seal 16.

Liquid overflowing weir 8 collects in separation zone 20 and forms liquid level 7. Bubble caps 19, having bubble slots 22 and risers 25, are positioned throughout separation zone 20 and a liquid pressure seal 21 is formed by the liquid between bubble slots 22 and liquid level 7. Vapor rising from area 18 will pass through bubble caps 19 only at a pressure sufficient to overcome the pressure drop resistance formed by the liquid pressure seal 21, the resistance being less than that established by liquid pressure seal 16.

Liquid overflowing weir 6 collects in separation zone 30 and forms liquid level 5. Bubble caps 24 having bubble slots 27 and risers 35 are positioned throughout separation zone 30 and a liquid pressure seal 26 is formed by the liquid between bubble slots 27 and liquid level 5. Pressure seal 26 is less than pressure seal 21.

At the low end of design vapor flow rates, i.e. at the lowest concentration of volatile component and lowest feed rate, all vapor flow will be directed to separation zone 30 because the pressure is only sufficient to permit passage through risers 35, bubble slots 27, and liquid pressure seal 26. The pressure seals 16 and 21 in zones 10 and 20 are too high to permit vapor flow. At a discretely higher vapor flow rate, sufficient to overcome the pressure drop resistance established by pressure seal 21, separation zone 20 will activate and a portion of the tray vapor flow will be directed to that zone in addition to separation zone 30. This process then is repeated for higher vapor flow rates thus bringing separation zone 10 into the distillation process.

In a preferred embodiment vapor flow restrictors are utilized with bubble apertures to prevent liquid entrainment at high or maximum design vapor flow rates. Such restrictors are established in those separation zones having the lowest or lower liquid pressure seals. They act to increase the aperature resistance and tend to equalize cap flow rates. Generally, cap flow rates should be within 20% of each other at maximum design vapor flow for the tray. One mechanism for establishing flow restrictors with bubble cap aperatures is to use risers of different diameter. For example when bubble caps 14, 19, and 24 are of similar size and design, risers 15, 25, and 35 have successively smaller inside diameters, which then serve as flow restrictors. Alternatively, bubble caps 24, 19, and 14 can be of differing sizes; e.g., they can be of an increasing size so as to accomodate succeedingly larger vapor flows, respectively, in the different separation zones, particularly in a separation zone having greater liquid head. The smaller bubble caps still function as flow restrictors.

Figure 2:
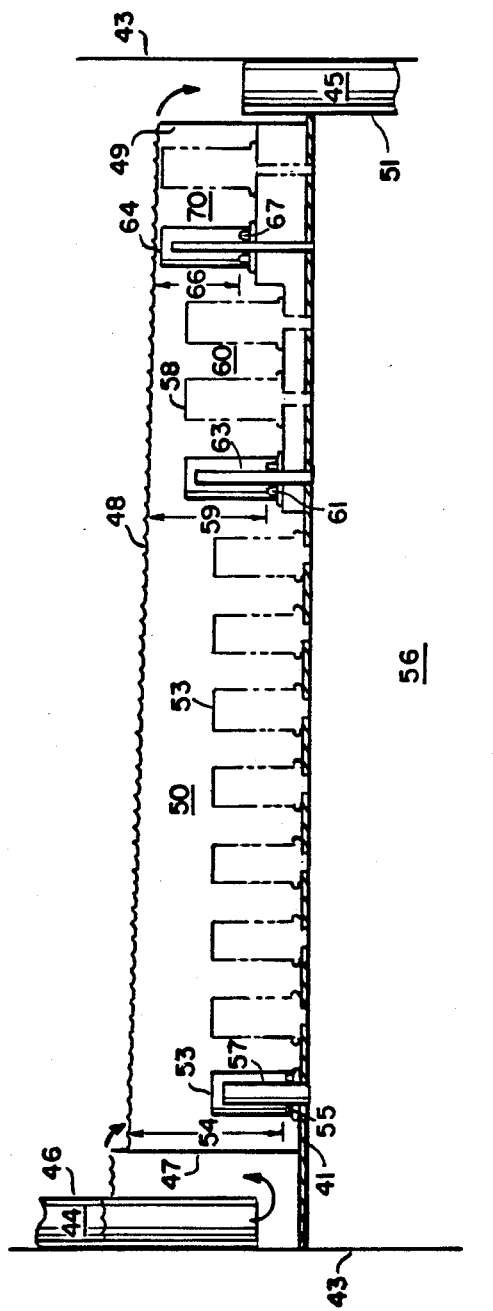
FIG. 2 is a horizontal view of a bubble tray having separation zones of varying bubble cap slot elevations below the liquid level.

Referring to FIG. 2, a bubble tray is shown having separation zones where the liquid pressure seals are established by varying the position of bubble cap slot elevations below the liquid level. Bubble tray 41, having stepped tray floor 42 to prevent liquid from flowing under the bubble caps, is fixed to outer shell 43 of a distillation column (not shown). Liquid 44 is passed through downcomer 46, over inlet baffle 47, and over weir 49 to form liquid level 48 on the bubble tray (direction indicated by arrow). The liquid after passing over weir 49 passes to outlet zone 45 and falls through downcomer 51 to the bubble tray below (not shown). Bubble caps 53 are positioned throughout an upstream tray portion in the path of liquid flow (as shown by the arrow) across tray floor 42 to form a separation zone 50 having a liquid pressure seal 54 established by liquid between bubble slots 55 in bubble caps 53 and liquid level 48. Vapor passes through the bubble tray, risers 57 and bubble slots 55 when the vapor pressure is sufficient to overcome the resistance equal to liquid pressure seal 54.

Bubble caps 58 are positioned at an elevation above bubble caps 53 to form separation zone 60 downstream from separation zone 50. A pressure seal 59 is established by liquid between bubble slots 61 and liquid level 48. The distance of the bubble slots 61 below liquid level 48 is such that liquid pressure seal 59 is less than liquid pressure seal 54.

Bubble caps 64 are positioned at an elevation above bubble caps 58 to form separation zone 70 downstream from separation zone 60. A liquid pressure seal 66 is formed by the liquid between bubble slots 67 and liquid level 48. The distance of bubble slots 67 below liquid level 48 is such that liquid pressure seal 66 is less than liquid pressure seal 59 in separation zone 60.

In the above description liquid pressure seals 54, 59, and 66, respectively, impede the flow of vapor rising through the separation zones with succeedingly smaller vapor flow resistance. Thus at low vapor flows, vapor will be directed to separation zone 70. As the vapor flow is increased, separation zone 60 and then separation zone 50 become operative. The discrete liquid pressure seals 54, 59 and 66 need not vary progressively, that is, any successive separation zone in the path of liquid flow across the tray can have either an increased or decreased discrete liquid pressure seal over a precedent separation zone.

As noted in the discussion of FIGS. 1 and 1A, the differing vapor flow resistance of separation zones 50, 60 and 70 will cause proportionately more vapor flow per bubble cap to flow to those separation zones having the lower liquid pressure seal. Such tendency is offset by utilizing flow restrictors in the bubble aperatures. Restricting riser cross-sectional area is a preferred means for increasing dry cap resistance to vapor flow when a uniform size and design of bubble cap is used. In this manner, risers 57, 63, and 69 are shown having successively smaller inside diameters to operate as flow restrictors so as to provide equal vapor flow through all caps at the maximum design vapor rate to the tray.

The bubble tray, of my invention is designed in the following manner. First, one determines the heat and material balance around a bubble tray at a select location in the bubble tray distillation column. (Prior to doing this it is assumed one has already calculated the theoretical number of bubble trays for the column and the position of each tray in the column.) The heat and material balances for each tray gives the maximum and minimum liquid and vapor flow rates across and through the tray based on a specified theoretical efficiency of the trays in the column. Such vapor flow rates consider the concentration range of the multicomponent feed to the column, and the variation in the feed flow rate. After determining the overall range of the liquid and vapor flow rates passing across each tray, the number and size of bubble aperatures are calculated. (Bubble aperatures can take the form of bubble caps, bubble valves, or the like as long as no weepage occurs.)

The total number of a particular bubble aperture for the tray is determined by dividing a maximum vapor rate through the tray by a design maximum vapor capacity for each specified aperture. The maximum vapor capacity value is used in order to avoid excessive liquid entrainment. In bubble caps the following equation using Stokes' law equating the upward force of vapor flow on entrained liquid drops to the downward force of gravity is one means for determining the design maximum vapor capacity.

$$V = K_c \sqrt{(\rho_L/\rho_g) - 1}$$

Where:
$K_c$ is a design bubble cap vapor capacity constant which is derived from a Souders and Brown correlation between bubble cap vapor capacity and tray spacing at critical liquid entrainment in the vapors from a bubble cap of a particular design;
$\rho_L$ is the density of the liquid, (lbs./ft.$^3$);
$\rho_g$ is the density of the gas, (lbs./ft.$^3$); and
v is the actual cubic feet per minute of vapor flow per cap (ACFM/cap).

The next step after calculating the number of bubble caps importantly establishes the mechanism for accommodating the lowest design vapor flow rate for each tray while avoiding maldistribution and attendant tray inefficiency attributable to tray unlevelness as well as liquid level gradient. Only those trays having a ratio of maximum vapor rate to minimum vapor rate (maximum design turndown ratio) exceeding the conventional (published) design turndown ratio need be modified by establishing a plurality of separation zones on the tray.

The separation zones are established by breaking down the desired maximum design turndown ratio for the tray into a series of co-operating separation zones, each separation zone having a turndown ratio of a specified value; e.g. 8:1 or 4:1, depending on the bubble cap or aperture used. To determine the minimum number of separation zones, the turndown ratio for the separation zone is multiplied by the turndown ratio for another separation zone and so on which provides for an overall maximum tray turndown ratio. When the number obtained by multiplication of the several turndown ratios for the separation zones is equal to or greater than the maximum design turndown ratio, that tray will accommodate the maximum design turndown ratio and will have the minimum number of separation zones. For example, if a maximum design turndown ratio for a tray is 220, (established by dividing the maximum vapor flow rate by the minimum vapor flow rate), that turndown ratio is achieved by establishing at least four separation zones when each zone has a turndown ratio of about 4/1. This follows in that separation zone 1 will have a turndown ratio of 4:1. Separation zone 2 will have a turndown ratio of 4:1, and so on. On multiplying each separation zone turndown ratio, the sum 256 is achieved, e.g. $4 \times 4 \times 4 \times 4$. This sum is greater than 220, so it will accommodate that ratio. Three zones could be utilized to provide a tray of maximum design turndown ratio if two zones had a turndown ratio of 8:1 each and one had a turndown ratio of 4:1, e.g. $8 \times 8 \times 4$. Although fewer zones could be utilized, there would be some penalty of course in terms of maldistribution of vapor flow. However, this penalty will not be as great as if there were no separation zones. Further, the penalty may not be that significant and fewer zones may be used for design reasons. Of course, more separation zones than the minimum may be utilized so that each zone will operate over a narrower range than its design turndown ratio but again, no significant advantages would be realized.

The liquid level in the separation zone of least liquid head is selected to achieve sufficient liquid contacting for vapor rising through the liquid head from the bubble aperture. However, the liquid level further is influenced by a power requirement factor, i.e., a minimum power expenditure can be achieved by designing the liquid level such that the liquid head or pressure seal above the bubble cap slots establishes a minimum vapor flow pressure drop. The liquid level therefore should be high enough to provide for good liquid-gas contacting but not so high as to require an excessive power requirement. Such liquid levels can be calculated using conventional techniques.

The other separation zones which begin operation at higher vapor rates than the separation zones having lesser liquid heads inherently require greater liquid pressure seals. Several factors are to be considered in determining the pressure seals differential between these separation zones. First, the liquid pressure seal differential between two separation zones should be at least equal to the pressure seal of the zone having less liquid level. In addition, the pressure seal should include that liquid differential equal to the liquid level gradient across the tray and that caused by the unlevelness of the tray. Generally, unlevelness (an estimated value) is about ⅛ inch in large columns (10-50 feet diameter) or between tray supports and 1/16 inch in small columns (1-6 feet diameter). A lesser liquid pressure seal differential than that specified may permit greater maldistribution in separation zones at lower vapor rates. But, maldistribution will be less than that where there are no separation zones on the trays. Second, the liquid pressure seal should include a liquid differential which is sufficient to cause, at low vapor rates, the major portion of the vapor to flow through the zone of less liquid pressure seal to maintain design separation efficiency for the tray. As that pressure seal differential between zones is increased, maldistribution is decreased, but power consumption will be higher. Conversely, as the liquid differential between zones is decreased, maldistribution is greater, but less power will be used. The design pressure seal differential therefore is achieved by minimizing the cost of tray separation efficiency plus power consumption.

One simple method for initially determining the number of specified bubble apertures in each separation zone is by dividing the maximum vapor rate through the separation zone by the design aperture maximum vapor capacity. This simple calculation is similar to that for determining the number of aperatures on the tray discussed earlier and does not take flow restrictors into account. To determine the vapor rate for the initial separation zone, one divides the maximum vapor flow rate for the tray by the maximum design turndown ratio and then multiplys that value by the turndown ratio of the initial separation zone. With respect to the next separation zone the maximum vapor rate for the tray is divided by the combined turndown ratio for that zone and the initial zone. The value then is multiplied by the turndown ratio for that zone. For example, assume the calculated design turndown ratio is 512 (3 separation zones of 8:1 each) and the maximum design turndown ratio is 256. The vapor flow rate in the initial zone is $1/256 \times$ maximum tray vapor rate $\times 8$. The number of caps is found by dividing that number by the cap capacity. The flow rate for the next zone is $1/64 \times$ maximum tray vapor rate $\times 8$. The number of caps then is found by dividing that rate by the cap capacity.

It is recognized in the above calculation that there is essentially unused turndown capacity in the calculated turndown ratio of 512 versus the required 256 turndown ratio. Obviously not all zones will be operating over an 8:1 turndown ratio; i.e., some will be operating at 6:1 depending upon design. One way to optimize vapor flow which affects the number of caps in each zone and pressure seal differential is to equalize the turndown ratios between zones. In this case, the desired turndown ratio for each zone would be approximately 6.35. This number would be used for each turndown ratio between zones. The maximum tray vapor rate in the second zone would be divided by 40 rather than 64 and that number multiplied by 6.35. Another way is to recalculate restrictor area, e.g., riser diameters, which will be described, and determine new cap flow rates. Then, using new flow rates per cap, one can determine the number of caps through trial and error calculation.

The bubble apertures are provided with flow restrictors, in preferred cases, in at least one separation zone having less liquid head to increase the resistance to vapor flow through the bubble apertures. The flow restrictors offset the tendency of vapor to flow at high rates through such apertures having a lower pressure seal. Flow restrictors thereby provide means for aperatures in the several separation zones to co-operatively achieve more equalized flow through the caps at maximum design tray capacity. This feature permits one to avoid an excessive entrainment of liquid in the separation zones having lower liquid heads at maximum design vapor capacity.

To design the flow restrictor and accomplish the above result, the design bubble aperture vapor capacity is used in conjunction with the dry aperture pressure drop through the cap itself to make amendments to the bubble aperture size and increase resistance to vapor flow. The dry aperture pressure drop in the case of bubble caps is described by the following equation $$\Delta P = \frac{N\rho_g v^2}{2g_c 144}$$

Where:
ΔP equals cap pressure drop, psi;
N equals the number of velocity heads for a particular bubble cap design based on the sum of pressure drops through the cap, e.g., riser pressure drop, reversal flow pressure drop in the cap, and slot pressure drop, (dimensionless (1.85 typical));
$\rho_g$ equals vapor density, (lb./ft.$^3$);
v equals vapor velocity through the riser open area, (ft./sec.);
$g_c$ equals a gravitational constant, (32.2 lbs-ft./(lbs-sec.$^2$)); and
144 equals a conversion constant, (sq. in./sq. ft.).
Thereby, $$\Delta P = \frac{N\rho_g v^2}{2g_c 144} = \frac{N\rho_g v^2}{9273.6}$$

$$\Delta P = 0.000108 \; N\rho_g \; v^2.$$

At a given dry bubble cap pressure drop then, vapor flow can be reduced as compared to other bubble caps by decreasing riser cross-sectional area. In this way, riser inside diameter is decreased according to the equation to reduce vapor flow through a bubble cap which otherwise would operate above its design bubble cap capacity.

The method of designing the bubble tray of my invention is illustrated by the following example which should not be construed as limiting the scope of my invention thereto.

ILLUSTRATIVE EMBODIMENT

EXAMPLE I

Figure 3:
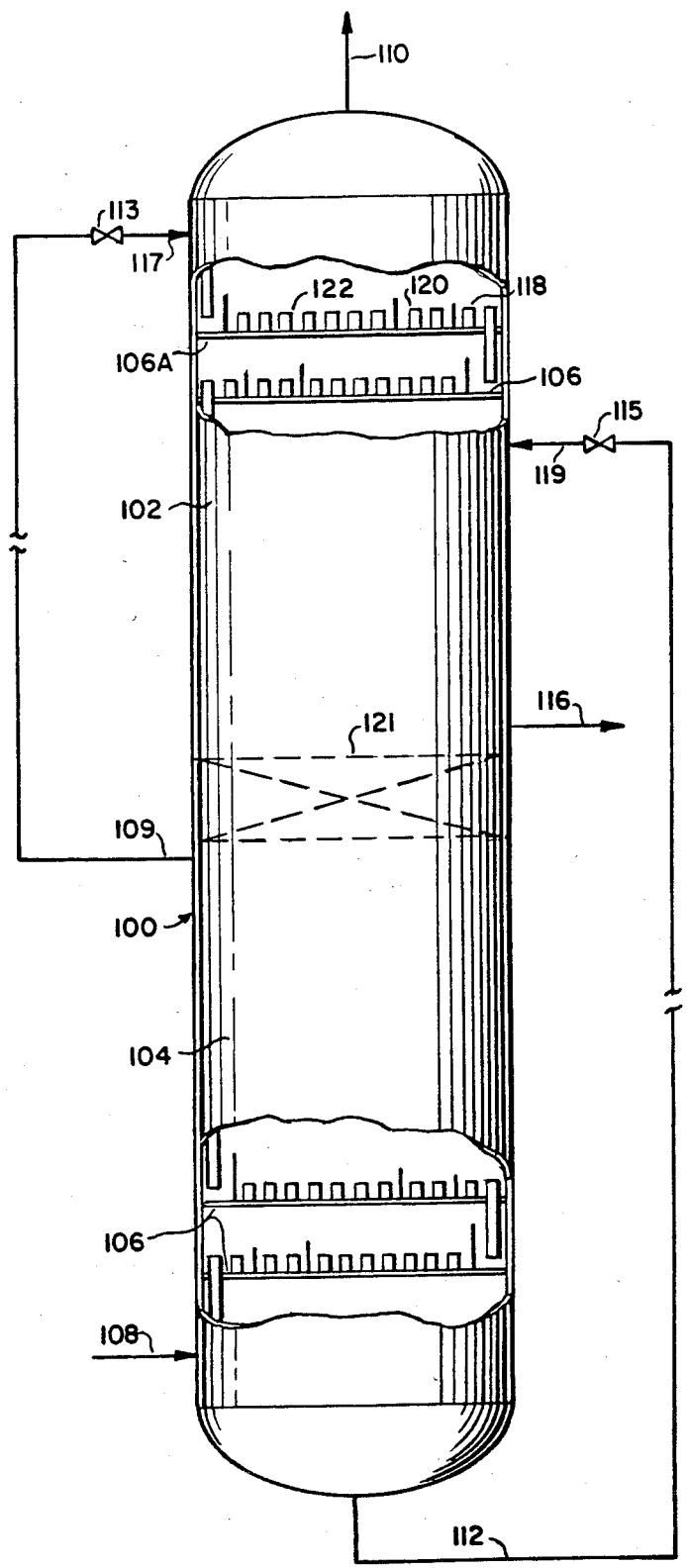
FIG. 3 is a front elevational view, partially in section, of a distillation column having a low pressure section and a high pressure section, incorporating my invention.

In this example and referring to FIG. 3, a Nitrogen Rejection Unit (NRU) designed for the distillation and separation of nitrogen from a feed containing nitrogen and methane, at a variable concentration from about 5–80 molar percent nitrogen is shown. In this example bubble tray distillation column 100 is of conventional bubble tray design and has a low pressure section 102 and high pressure section 104 with a plurality of trays 106 in each section. Trays 106 are of the same design as shown in FIGS. 1 and 1A. The feed is introduced into the high pressure section 104 through line 108 and distilled to produce an overhead nitrogen stream which is recovered through line 109 and a bottoms rich in methane through line 112. The overhead and bottoms streams, after intermediate heat exchange, are reduced in pressure through valves 113 and 115 and fed to the low pressure section 102 through lines 117 and 119. The N$_2$ overhead stream provides reflux for the low pressure section while the bottoms from the high pressure section is the low pressure section feed. Further distillation is accomplished in the low pressure section to provide overhead N$_2$ recovered through line 110 and methane bottoms through line 116. A reboiler-condenser 121 located between the high pressure and low pressure sections reboils low pressure section bottoms to provide boilup for stripping. This is accomplished in heat exchange with the high pressure section overhead N$_2$ which is consequently condensed and provides liquid reflux for the top rectifying section of the high pressure section as well as the liquid overhead N$_2$ leaving through line 109.

The design feed to high pressure section 104 in the column ranges from 80% N$_2$ to 5% N$_2$ over the duration of the operation. A feed flow turndown ratio of 5 to 1 within these concentration ranges is anticipated. The maximum vapor rate expected is 147.5 ft.$^3$/min. After performing a heat and material balance, the number of trays required were calculated. Then, mass balances were calculated for each tray. For purposes of this example only the top tray 106A is considered. The design turndown ratio needed to accomodate the wide concentration range on top tray 106A in low pressure section 102, assuming 100% separation efficiency, is 43, but an overall design tray turndown ratio of 215 is needed when the concentration and feed rate variation is accomodated.

The bubble cap specified for the application is a one-inch aluminum cap having an 8:1 design turndown ratio. Since the cap has a design turndown ratio of about 8:1, only three separation zones 118, 120 and 122 are needed to accomodate the 215 design turndown ratio as the maximum calculated turndown ratio capable of being handled by the tray is 512, (8×8×8=512).

The design bubble cap capacity for the specified bubble cap is calculated as follows. The liquid and vapor densities at top tray 106A are:

$\rho_L = 50$ lbs./ft.$^3$ and $\rho_g = 0.35$ lbs./ft.$^3$ $V = K_c\sqrt{(\rho_L/\rho_g)-1} = 0.04\sqrt{(50/0.35)-1} = 0.476$ ACFM/Cap.

The design bubble cap capacity, as calculated above, establishes an upper capacity limit of vapor flow through each of the specified caps before excessive entrainment occurs. Based on this capacity a total of 310 caps are required to accomodate a maximum tray vapor flow rate of about 147 ft.$^3$/min.

A primary level of liquid in separation zone 118 having the least liquid head is set at a height of 1 inch above the bubble cap slots. For the cap used, this level provides for good liquid-gas contacting at a reasonable power requirement.

Next the liquid differential between the separation zones is determined. It is estimated the levelness of bubble cap top tray 106A is maintained within a tolerance of $\frac{1}{8}$ inch, i.e., one side of the tray being no higher or lower than the other side by more than $\frac{1}{8}$ inch. The minimum level between zones therefore would be $\frac{1}{8}$ inch unless one wanted to absorb more penalty due to unlevelness. In this case a greater differential than the $\frac{1}{8}$ inch is used so that the tray unlevelness has less influence on the vapor maldistribution. Based upon the density of liquid on the top tray, a differential of $\frac{3}{8}$ inch, $\frac{1}{8}$ inch for unlevelness, and $\frac{1}{4}$ inch for separation efficiency was selected. For this tray the total liquid differential between separation zones 118 and 122 was $\frac{3}{4}$ inch. This differential is sufficient to give desired vapor flow distribution. Vapor flow distribution can be calculated by conventional techniques. If vapor flow maldistribution was too high, the differential between zones might be set higher, e.g. at $\frac{1}{2}$ to $\frac{5}{8}$ inch in order to reduce maldistribution. However, this increase would result in additional power requirements. A lesser pressure seal differential could have been used, e.g., $\frac{1}{8}$ inch, but that value would not have met flow distribution standards and consequent tray efficiency standards.

The optimum number of bubble caps by separation zone having succeedingly smaller liquid heads, e.g. 122, 120 and 118 obtained through trial and error is 240, 60, and 10 bubble caps, respectively. The simpler method for obtaining an appropriate number of caps in separation zone 118 is obtained by dividing the maximum design vapor flow rate through the tray, i.e. 147 ft.$^3$/min., by the maximum design turndown ratio expected, e.g. 215. On multiplying that value by the turndown ratio of the caps, i.e., 8:1, one obtains the maximum vapor flow rate through the zone. The number of caps i.e., about 11, necessary for zone 118 is easily calculated by dividing the maximum vapor flow rate by the maximum vapor capacity of the caps. Again initially, the number of caps required for separation zone 120 is found by dividing the maximum tray vapor flow, 147 cfm by the turndown ratio of two zones, e.g. 64. On multiplying that value by the turndown ratio for the caps in separation zone 120, one obtains the maximum vapor flow for the zone. Again dividing by the cap capacity, one obtains the number of caps necessary for the zone, e.g. 39 to about 40. The balance of the caps are used in separation zone 122.

To obtain a more uniform flow per cap at maximum vapor flow rate and maintain that flow within design criteria used here, flow restriction is provided for separation zones 118 and 120. First, the flow rate through the caps is determined from the differential in liquid head between zones and the dry pressure drop through the cap. The dry cap pressure drop for the specified cap at design vapor capacity is:

$$\Delta P = 0.000108 N \rho_g v^2$$

Where:

$N = 1.85$ velocity heads for this cap,
$\rho_g = 0.35$ lbs./ft.$^3$, $$v = \frac{0.476 \text{ ft.}^3 \times 144 \text{ in.}^2/\text{ft.}^2}{60 \times .0583 \text{ in.}^2/\text{cap (riser area)}} = 19.6 \text{ ft./sec.}$$

Thereby, $\Delta P = 0.000108 \times 1.85 \times 0.35 \times (19.6)^2 = 0.027$ psi which, when converted to liquid nitrogen head equivalent becomes $$\Delta P = 0.027 \text{ psi} \times \frac{144 \text{ in.}^2/\text{ft.}^2}{50 \text{ lbs./ft.}^3} \times 12 \text{ in./ft.}$$

= 0.93 inches liquid nitrogen

Since the separation zone liquid head differential is 0.0375 inches of liquid nitrogen, the flow variation through a cap in separation zones 120 and 122 without restrictors, would be approximately 118 and 134 percent of a cap in zone 118. Knowing the variation, the vapor flow per cap was equalized by reducing riser diameters for the bubble caps in separation zones 118 and 122. To determine the extent of reduction, one calculates new flow areas and new N numbers by conventional techniques. The new N numbers are calculated assuming that riser pressure drop contributes 50% of total cap pressure drop or 0.465 inches N$_2$. New riser flow areas then are obtained from the equation $$\left(\frac{An}{Ao}\right)^2 = \frac{\Delta Po}{\Delta Pn}$$

where $An$ and $Ao$ are flow areas for the new and original riser. $\Delta P_n$ and $\Delta P_o$ are new and original riser pressure drops. The values calculated for substantially equal flow at maximum vapor flow rate are indicated in the following table.

| Separation | Riser Area, inches$^2$ | | N | |
| Zone | Original | New | Original | New |
|---|---|---|---|---|
| 122 | .0583 | .0583 | 1.85 | 1.85 |
| 120 | .0583 | .0434 | 1.85 | 1.44 |
| 118 | .0583 | .0361 | 1.85 | 1.28 |

Vapor flow in caps present in separation zones 118 and 120 were calculated as follows:

As vapor flow is reduced during operation, the rate at which section 122 becomes inactive (no vapor flow), the overall tray pressure drop will be 1¾ inches liquid which is the liquid level in section 122. Since sections 120 and 118 have operating liquid levels of 1⅜ and 1 inch, respectively, the dry cap pressure drop for these sections will be, by difference, ⅜ and ¾ inch liquid head differential respectively. Likewise, as the vapor flow is further reduced to the rate at which section 120 becomes inactive, the tray pressure drop will be 1⅜ inch which is the liquid level in section 120. Again, the dry cap pressure drop at this time for section 118, by difference, will be ⅜ inch liquid head differential. With a dry cap pressure drop equivalent to ⅜ inch liquid for section 120, $H = 0.375$ The dry cap pressure drop, $$\Delta P = \frac{0.375 \, \rho L}{1728} = \frac{0.375 \times 50}{1728} = .0108 \text{ psi}$$

where $\rho L$ = density of liquid nitrogen, 16/Ft$^3$.

As stated previously, $$\Delta P = 0.000108 N \rho_g v^2$$

consequently $$0.0108 = 0.000108 N \rho_g v^2$$

therefore $$V = \sqrt{100/N\rho_g}$$

Also as stated previously $$V = Kc \sqrt{\frac{\rho L}{\rho_g} - 1}$$

For the caps of section 120 with restrictors $N = 1.44$ and riser area of 0.0434 in$^2$, $$v = \sqrt{100/1.44 \times .35} = 14.09 \text{ Ft/sec.}$$

-continued
$$V = 14.09 \times \frac{.0434 \times 60}{144} = 0.256 \, ACFM.$$

The table shows individual bubble cap capacities at design rates and at each turndown rate:

|  | Cap Capacity, ACFM/Cap | | |
|---|---|---|---|
|  | Zone 122 | Zone 120 | Zone 118 |
| All separation zones active | 0.476 | 0.476 | 0.476 |
| Zones 120 & 118 active | — | 0.256 | 0.319 |
| Zone 118 active | — | — | 0.226 |

Once knowing the cap capacities, the bubble cap count per separation zone can be determined, assuming a turndown ratio of 8:1 between sections.

With a total tray vapor design capacity of 147.56 ACFM the total number of caps required is $$\frac{147.56}{.476} = 310$$

Since the turndown capacities in sections 122 and 120 will both be 8 to 1, the total turndown will be 64 to 1, i.e. with sections 122 and 120 inactive, section 118 will have a vapor flow of 1/64 of the tray design flow of 147.56 ACFM. Since each cap in section 118 will have a flow capacity of 0.226 ACFM, the calculated number of caps required is $$n = \frac{147.56}{64 \times .226} = 10.20 \text{ caps}.$$

With section 122 inactive and with 10 caps specified for section 118, the vapor flow through sections 120 and 118 will be $$n_{120} \times .256 + 10 \times .319 = \frac{147.56}{8}$$

Therefore, the number of caps calculated for section 120 is 59.59. The cap count for the three sections would therefore be made 240, 60, and 10.

The vapor flows of the three tray separation zones 118, 120 and 122 at the transition points are summarized in the table below:

|  | Total Vapor Flow, ACFM | | | |
|---|---|---|---|---|
|  | Zone 122 | Zone 120 | Zone 118 | Total |
| Max. vapor rate | | | | |
| All Zones Active | 114.24 | 28.56 | 4.76 | 147.56 |
| Zones 118 & 120 | 0 | 15.36 | 3.19 | 18.55 |
| Zone 118 Active | 0 | 0 | 2.26 | 2.26 |

From the above table, the turndown ratio for each of separation zones 122 and 120 is about 8:1. The actual turndown ratio for separation zone 118 is 3.35. The unused turndown capacity is generally absorbed in the separation zone of least liquid head since full turndown in that zone would result in lower efficiency. It does not have a zone in which lower vapor rates can be shared as do separation zones 122 and 120.

To enhance the separation efficiency, each tray in the column is analyzed in the same way, and if the maximum to minimum vapor ratio exceeds the recommended turndown ratio for the cap employed, the tray is sectioned as noted above.

Although the design of the above installation accommodates the distillation of nitrogen from a feed containing nitrogen and methane at a variable concentration of 5–80 molar percent nitrogen and a feed flow turndown ratio of 5 to 1, it is contemplated that the bubble tray of our invention can be designed to accomodate wider concentration ranges, e.g. 3–90 molar percent nitrogen, and wider feed flow turndown ratio of from 10–100% of a maximum design feed rate.

EXAMPLE II

The purpose of this Example is to illustrate experimental results on a laboratory unit which verifies the accuracy of the design technique in Example 1 having two separate zones. An intermediate weir was positioned on a bubble tray having 436 bubble caps of substantially identical size, thereby establishing two separation zones, i.e., 332 bubble caps in an upstream separation zone, and 104 bubble caps in a downstream separation zone. The intermediate weir had a height such that the upstream separation zone had a ¼ inch differential in liquid head over that established in the downstream separation zone. The height of liquid level in the downstream zone was ⅝ inches water. Water was passed from an inlet over the tray and through the separation zone in series, and air was passed up through the tray separation zones in parallel in order to observe the performance of the bubble tray. The following table presents the results observed.

| Liquid Rate GPM | Vapor Rate CFM |  |
|---|---|---|
| 1 | 0 | Caps weeped slightly due to leaks around tray seal, about 1 drop every 10 seconds. |
| 2.53 | 509.7 | Some spray reached 2 ft. High degree of backmixing seen with an injection of dye. |
| 2.53 | 262 | Fairly even froth height, slightly higher at inlet. Good distribution shown by dye injection. |
| 2.53 | 236.4 | All caps bubbled. Dye injected at inlet center spread to ½ outlet weir length. Injection at inlet end spread to ¼ outlet weir length. |
| 2.53 | 226.5 | 3 caps did not bubble. This was about the limit of perfect distribution. |
| 2.53 | 153 | Tried leveling the tray. Bubbling appeared to be fairly uniform. A vapor load on tray caused some bowing in center. The tray could not be leveled unless air load is taken off. Bubbling in downstream zone was always uniform. |
| 2.53 | 68.9 | Bubbling was non-uniform in upstream zone, uniform in downstream zone. |
| 2.53 | 58.7 | No bubbling in upstream zone, uniform in downstream zone. |
| 2.53 | 49.7 | No bubbling in upstream zone, uniform in downstream zone. |
| 2.53 | 60.9 | No bubbling in upstream zone, uniform in downstream zone. This was exactly the transition point. Dye injection at the intermediate weir showed excellent distribution 3″–6″ across active area of downstream zone. |

-continued

| Liquid Rate GPM | Vapor Rate CFM | |
|---|---|---|
| 2.53 | 39.5 | Still uniform in downstream zone. |
| 2.53 | 27.7 | 10 caps stopped bubbling. Dye injection at the intermediate weir spread to 2"-4" across active area of downstream zone. |
| 2.53 | 14.0 | Lower vapor rate limit. 30 caps stopped bubbling. By shifting the tray level, all but 10 caps in the downstream zone bubbled. |
| 2.53 | 0 | 14 caps in upstream zone were weeping liquid. |
| 2.53 | 126 | A third weir ¾" was inserted in the upstream zone and improved non-uniform bubbling remarkably. |

The measured critical points of 60.9 CFM at transition and 509 CFM at overburden may be compared to design calculations. The design bubble cap capacity was $$K_c = 0.04 = \frac{ACFM/cap}{\sqrt{(\rho_L/\rho_g) - 1}}$$

Where:
$\rho_L$ for water is 62.4, and
$\rho_g$ for air at 0.075,
Thereby, $$ACFM/cap = .04\sqrt{\left(\frac{62.4}{.075}\right) - 1} = 1.15\ ACFM/cap$$

Therefore, before overburden or entrainment, the tray design rate = 1.15 ACFM/cap × 436 caps = 501 ACFM. The theoretical transition point was determined by first determining the relationship of pressure to velocity for the small caps used in this example.

$$\Delta P = \frac{N\rho_g v^2}{2g_c 144}$$

$$\Delta P = 0.000108\ N\rho_g v^2$$

Second, the pressure drop due to a ¼ inch zone liquid head differential was calculated.

$$\Delta P = \frac{0.25\ in. \times 62.4\ lbs./ft.^3}{12\ in./ft. \times 144\ in.^2/ft.^2} = 0.00903\ psi$$

At the transition point the pressure drop through the dry cap in the downstream separation zone is approximately the pressure of the zone liquid head differential, and $\Delta P$ is set at that value. The actual vapor capacity V using a value of 1.85 for N and 0.075 for $P_g$ then is calculated as follows:

$$\Delta P = 0.000108\ N\rho_g v^2 = 0.00903$$

$$v^2 = \frac{0.00903}{0.000108\ (1.85)(0.075)} = 602.6$$

$$v = 24.55\ ft/sec./cap$$

$$V = 24.55\ ft./sec. \times \frac{.0583\ in.^2/cap}{144\ in.^2/ft.^2} \times \frac{60\ sec}{min.}$$

$$= 0.596\ ACFM/cap$$

The total downstream separation zone vapor rate is 0.596 ACFM/cap × 104 caps = 62 ACFM The 62 ACFM vapor flow calculated compares to a value of 60.9 observed using the apparatus of this invention.

I claim:

1. In a distillation process for the separation of a volatile component from a less volatile component in a liquid multicomponent feed which comprises
   charging said multicomponent feed to a distillation column having a plurality of bubble trays, said trays having a plurality of bubble apertures;
   passing said multicomponent feed over said bubble trays whereby the feed is converted into a vapor fraction rich in a volatile component and a liquid fraction rich in less volatile component; and
   removing said vapor fraction as overhead from the column and said liquid fraction as bottoms from the column;
   the improvement for accommodating a liquid multicomponent feed having a variable, wide concentration range of volatile component to said less volatile component and accommodating varying rates of feed to the column without destroying bubble tray efficiency which comprises:
   establishing a plurality of distinct separation zones on at least one bubble tray, said separation zones extending across said bubble tray and traversing a liquid path having a liquid gradient formed by the feed flowing from an inlet to an outlet across the tray, said separation zones including a plurality of bubble apertures;
   maintaining a liquid head of substantially constant and uniform height, except for the difference associated with the liquid gradient, above said bubble apertures within each separation zone; and
   maintaining in at least one of said separation zones a greater liquid head than that in another separation zone on said tray with the differential between the two liquid heads being greater than the liquid gradient across the separation zones.

2. A process according to claim 1 wherein vapor flow restrictors are incorporated with said bubble apertures in at least one separation zone of lower liquid head, said bubble apertures comprise bubble caps having bubble slots and risers, and said risers in at least one separation zone have less flow area than risers in a separation zone having a greater liquid head.

3. In a process for the separation of a volatile component from a less volatile component in a multicomponent feed which comprises:
   charging said multicomponent feed to a distillation column having a plurality of bubble trays, said trays having bubble apertures therein,
   converting said multicomponent feed into a plurality of vapor fractions and a plurality of liquid fractions,
   causing liquid fractions to flow over bubble apertures from an inlet to an outlet on said trays thereby establishing a liquid path having a liquid gradient on said trays, passing vapor fractions through said bubble apertures for contacting said liquid fractions, and removing said volatile component in an overhead vapor stream and said less volatile component in a bottoms liquid stream;

the improvement for accomodating a multicomponent feed having a wide concentration range of said volatile component to said less volatile component and accommodating varying rates of said feed to the column without destroying bubble tray efficiency comprising:

establishing a plurality of separation zones traversing said liquid path on at least one of said bubble trays, each separation zone extending across said bubble tray and including a plurality of said bubble apertures, each zone having a liquid head of a discrete height above said bubble apertures with at least one separation zone having a differential in said discrete liquid head over another greater than the liquid gradient over said zones; and incorporating vapor flow restrictors with said bubble apertures in at least one separation zone of lower liquid head, wherein said bubble apertures comprises bubble caps having bubble slots and risers, and said vapor flow restrictors comprise risers having less flow area than risers in a separation zone having a greater liquid head.

* * * * *